W. W. HAMILTON.
OIL HEATER.
APPLICATION FILED APR. 2, 1920.

1,362,789.

Patented Dec. 21, 1920.
2 SHEETS—SHEET 2.

Inventor
William W. Hamilton
By W. W. Williamson
Atty.

UNITED STATES PATENT OFFICE.

WILLIAM W. HAMILTON, OF PHILADELPHIA, PENNSYLVANIA.

OIL-HEATER.

1,362,789.

Specification of Letters Patent.

Patented Dec. 21, 1920.

Application filed April 2, 1920. Serial No. 370,626.

*To all whom it may concern:*

Be it known that I, WILLIAM W. HAMILTON, a citizen of the United States, residing at Philadelphia, in the county of Philadelphia and State of Pennsylvania, have invented new and useful Improvements in Oil-Heaters, of which the following is a specification.

My invention relates to a new and useful improvement in oil heaters, and has for its object to provide an exceedingly simple and effective construction of a hot air heater for buildings by which oil may be utilized as a fuel for projecting a flame into a peculiarly constructed fire chamber and the heat thereof so regulated and stored as to give an even and regular temperature to the rooms to which the heater is connected by suitable pipes.

A further object of my invention is to provide for initially transmitting the major portion of the heat directly to the heating drum, and when the proper temperature has been produced in said drum cutting off this direct action of the heat by the intervening refractory baffle plate.

A further object of my invention is to provide for absorbing and storing the surplus heat.

A still further object of my invention is to provide for the proper circulation of the air flowing to the heating drum whereby said air will more readily absorb the heat from the fire bed chamber and the casing of the latter, and A still further object of my invention is to provide means for conveying the drippings from the oil burner to the outside of the heater.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Figure 1:
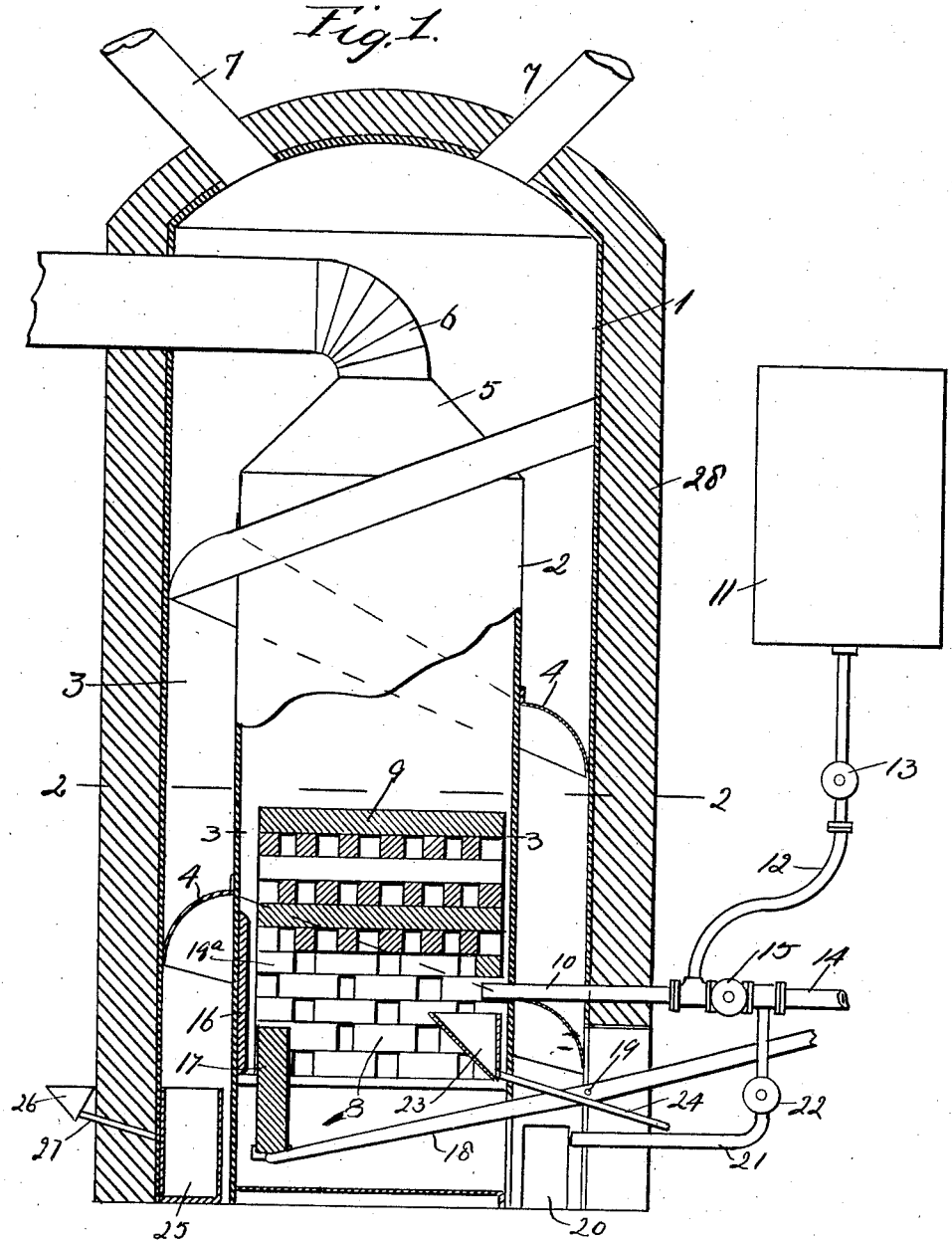
Figure 1, is a central vertical section of a hot air heater made in accordance with my improvement.
Figure 2:
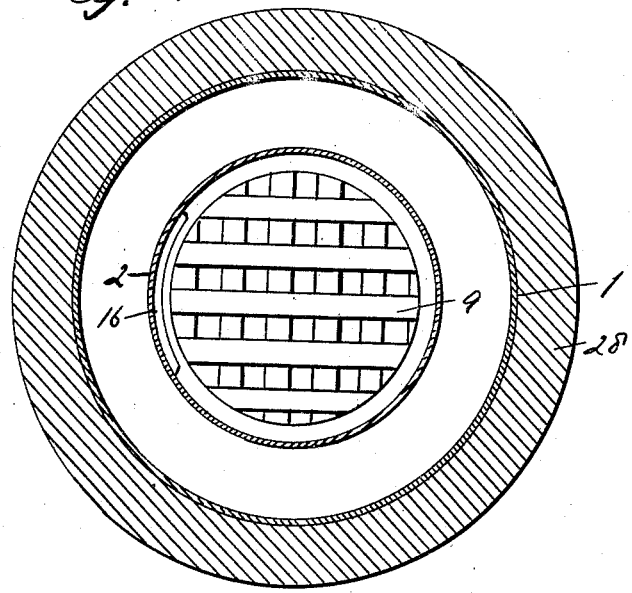
Fig. 2, is a section at the line 2—2 of Fig. 1.
Figure 3:
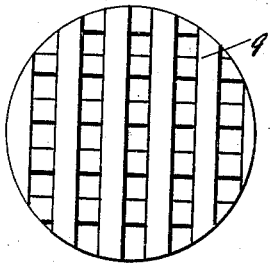
Fig. 3, is a section on the line 3—3 of Fig. 1.

In carrying out my invention as here embodied, 1 represents a drum or casing in which is located the heating cylinder 2 of such diameter relative to the casing as to leave a considerable space therebetween which serves as a passageway 3 for the air to be heated and delivered to the building.

Within this passageway is located a spiral deflector 4 which will cause the air being heated to take a spiral motion around the dome or upper portion of the drum.

The cylinder 2 is provided with a conical cap 5 to which is fitted the pipe 6 which passes out through the drum for connection with a chimney, and the upper portion of the drum has the flue pipes 7 leading therefrom to the portions of the building to be heated and there may be any desired number of these flue pipes.

Within the lower portion of the heating cylinder is arranged a cylindrical wall 8 of staggered blocks such as brick forming a hollow space which serves as the fire box. Upon the top of these blocks is arranged a series of staggered bars 9 so placed as to form a cover for the fire box yet permit the products of combustion to pass therethrough, and these blocks and bars are of fire clay or like material adapted to absorb and store heat transmitted thereto.

10 represents an oil burner which is supplied with oil from the gravity tank 11, said tank being connected with the burner by the pipe 12 having a stop cock 13 therein for regulating the flow of oil, and the burner is also supplied with air through the pipe 14 from any suitable air pressure source, the flow of said air to the burner being regulated by the stop cock 15. This burner projects through the drum and cylinder into the fire box so as to project an intense flame across said fire box to the opposite wall of the cylinder, and upon this opposite wall is located a metal plate 16 against which the flame may impinge. This arrangement will permit this plate 16 to become highly heated when the burner is first lighted transmitting this intense heat to the space 3 and the spiral deflector 4 is so located in said space as to cause the entire incoming air to flow directly across that portion of the cylinder to which the plate 16 is secured thus quickly heating this air and consequently supplying the hot air necessary to heat the building.

17 represents a baffle plate which is preferably made of fire clay or highly refractory material which pivotally rests on the inner end of the lever 18, said lever being pivoted at 19 and projecting outside of the heater in order that it may be so manipulated as to move said baffle plate upward within the space 19 in front of the plate 16 or lower said baffle plate. By this last described arrangement when sufficient initial heat has been provided the baffle plate 17 is raised in the path of the flame issuing from the burner 10 so that thereafter said flame will impinge upon said baffle plate and be deflected within the interior of the fire box thereby causing the walls and top of said fire box to become highly heated and thereafter this heat will be transmitted in an even and uniform manner to the walls of the cylinder 2 and from thence absorbed by the air traveling in a spiral direction around said cylinder as before described.

Under ordinary conditions the inlet 20 permits sufficient air to pass into the space 3 for heating the building, but when special conditions arise air under pressure may be projected into the space 3 through the pipe 21 which leads from the main air pipe 14 and has a stop cock 22 for regulating this air flow.

As there is often a tendency in a hot air heater for the air circulating therein to be sluggish in its movements and sometimes even to have a tendency to flow in a reversed direction on account of adverse drafts this projecting of air under pressure into the air passageway is highly advantageous since it provides means for effectually overcoming such tendencies and producing a direct and lively circulation within the drum.

In order that any drippings of oil which may take place from the inner end of the burner 10 may not accumulate within the heater and become dangerous, I locate a receptacle 23 beneath the inner end of the burner and lead therefrom a small pipe 24 to a convenient point outside of the heater where it may be caught and returned to the tank 11.

25 represents a water receptacle located within the space 3 at the bottom thereof, and this receptacle has connected therewith the funnel 26 by means of the pipe 27, the top of said funnel being on approximately the same level as the top of the water receptacle so that when said receptacle is filled with water the level of the water within the funnel will indicate this fact. By maintaining water in this receptacle the same will become heated sufficiently to throw off vapor, said vapor commingling with the air circulating in the passage 3 relieving the heated air when delivered to the rooms of its intense dryness and as the products of combustion pass out through the pipe 6 to the chimney the circulating air is not fouled and the heating of the building is accomplished in a highly sanitary manner.

The outer walls of the drum 1 may be inclosed in a suitable heat insulating material 28 so as to prevent undue loss of heat by radiation.

Of course I do not wish to be limited to the exact details of construction as herein shown as these may be varied within the limits of the appended claims without departing from the spirit of my invention.

Having thus fully described my invention, what I claim as new and useful is:—

1. In a hot air heater, a drum, a heating cylinder located within said drum in such manner as to form a circulating space therebetween, a deflector arranged in spiral form around said cylinder within said space, an oil burner projecting into the cylinder, a plate secured upon the interior of the cylinder against which a flame issuing from the burner will impinge, a baffle plate, and means for raising said baffle plate within the path of the flame or lowering the same.

2. In a hot air heater, a drum, a heating cylinder located within said drum in such manner as to form a circulating space therebetween, a deflector arranged in spiral form around said cylinder within said space, an oil burner projecting into the cylinder, a plate secured upon the interior of the cylinder against which a flame issuing from the burner will impinge, a baffle plate, means for raising said baffle plate within the path of the flame or lowering the same, a tank for holding and feeding oil to the burner, and means for feeding air from a pressure source to the space between the drum and cylinder.

3. In a heater of the character described, a drum, a heating cylinder located within said drum and concentric therewith, a spiral deflector arranged around the cylinder, a fire box the walls of which consist of staggered blocks, a series of staggered bars forming a top for said fire box, an oil burner for projecting a flame within said fire box, and a baffle plate adapted to be brought into or out of the path of said flame.

4. In a heater of the character described, a drum, a heating cylinder located within said drum and concentric therewith, a spiral deflector arranged around the cylinder, a fire box the walls of which consist of staggered blocks, a series of staggered bars forming a top for said fire box, an oil burner for projecting a flame within said fire box, a baffle plate adapted to be brought into or out of the path of said flame, and a plate arranged upon the inside of the cylinder opposite the burner against which the flame impinges when the baffle plate is out of the path of the flame.

In testimony whereof, I have hereunto affixed my signature.

WILLIAM W. HAMILTON.